United States Patent
Fukumori et al.

(10) Patent No.: US 8,796,371 B2
(45) Date of Patent: Aug. 5, 2014

(54) RESIN COMPOSITION AND ELECTRICALLY INSULATING PART OBTAINED FROM THE SAME

(75) Inventors: Kenzo Fukumori, Nisshin (JP); Mitsumasa Matsushita, Nagoya (JP); Yoshihide Katagiri, Nisshin (JP); Takuya Morishita, Nagoya (JP); Koji Nakanishi, Konan (JP); Takashi Nagase, Nisshin (JP); Joji Yoshimura, Toyota (JP); Yasuhiro Ueno, Toyota (JP); Hisayoshi Chiba, Anjyo (JP); Naoki Yoshida, Toyota (JP)

(73) Assignees: Kabushiki Kaisha Toyota Chuo Kenkyusho, Aichi (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/699,655

(22) PCT Filed: Aug. 9, 2011

(86) PCT No.: PCT/JP2011/068493
§ 371 (c)(1),
(2), (4) Date: Nov. 23, 2012

(87) PCT Pub. No.: WO2012/020846
PCT Pub. Date: Feb. 16, 2012

(65) Prior Publication Data
US 2013/0131252 A1    May 23, 2013

(30) Foreign Application Priority Data
Aug. 9, 2010   (JP) .................................. 2010-178773

(51) Int. Cl.
| C08K 3/00 | (2006.01) |
| C08K 3/10 | (2006.01) |
| H01B 3/30 | (2006.01) |
| C08K 3/16 | (2006.01) |
| C08K 7/06 | (2006.01) |

(52) U.S. Cl.
CPC ...... *H01B 3/301* (2013.01); *C08K 7/06* (2013.01); *C08K 2201/011* (2013.01); *C08K 3/16* (2013.01); *H01B 3/307* (2013.01)
USPC ........................................... 524/401; 524/436

(58) Field of Classification Search
USPC ....................................................... 524/401
See application file for complete search history.

(56) References Cited

U.S. PATENT DOCUMENTS

| 2005/0176835 A1* | 8/2005 | Kobayashi et al. ............. 521/56 |
| 2009/0069483 A1 | 3/2009 | Komatsu et al. |
| 2009/0174279 A1* | 7/2009 | Sheaffer et al. ............... 310/201 |
| 2011/0152435 A1* | 6/2011 | Morishita et al. ............. 524/504 |

FOREIGN PATENT DOCUMENTS

| JP | A-2007-517968 | 7/2007 |
| JP | A-2008-293911 | 12/2008 |
| JP | A-2009-084551 | 4/2009 |
| JP | A-2009-165346 | 7/2009 |
| JP | A-2010-100837 | 5/2010 |
| WO | WO 2010035851 A1 * | 4/2010 ............. C08L 33/12 |

* cited by examiner

*Primary Examiner* — Hui Chin
(74) *Attorney, Agent, or Firm* — Oliff PLC

(57) ABSTRACT

A resin composition includes 0.1 to 40% by mass of a carbon-based nanofiller, 5 to 90% by mass of a resin, and 5 to 90% by mass of calcium fluoride.

20 Claims, No Drawings

RESIN COMPOSITION AND ELECTRICALLY INSULATING PART OBTAINED FROM THE SAME

TECHNICAL FIELD

The present invention relates to a resin composition comprising a carbon-based nanofiller, and an electrically insulating part obtained from the resin composition.

BACKGROUND ART

Recently, there has been a trend toward downsizing and high power in resin parts for electrical or electronic use for automobiles and the like. With this trend, the heat dissipation properties of such resin parts have been important factors. For this reason, there is a demand for resin parts whose thermal conductive properties are greatly improved with electrical insulating properties thereof being maintained. In addition, as the thicknesses of such resin parts are reduced for the downsizing and the heat dissipation improvement of the resin parts, resin parts having a good balance of high levels of strength, rigidity, and impact resistance have been demanded.

Conventionally known electrically insulating resin materials having high thermal conductive properties include those obtained by adding to a resin a large amount of an electrically insulating filler having high thermal conductive properties, such as alumina or boron nitride. However, the addition of an electrically insulating filler having high thermal conductive properties in a large amount causes a problem of deterioration in strength and impact resistance and a problem of deterioration in molding processability. Moreover, since the fillers having high thermal conductive properties are expensive, there is room for improvement in production costs.

Japanese Unexamined Patent Application Publication No. 2002-188007 (PTL 1), Japanese Unexamined Patent Application Publication No. 2003-40619 (PTL 2), and International Application Japanese-Phase Publication No. 2007-517968 (PTL 3) disclose resin composite materials and resin compositions each comprising a resin and calcium fluoride, and also disclose that these resin composite materials and resin compositions are excellent in thermal conductive properties and moldability. However, these resin composite materials and resin compositions do not have a good balance of high levels of thermal conductive properties, strength, rigidity, and impact resistance, and are insufficient as materials for resin parts for electrical or electronic use for automobiles and the like.

Meanwhile, since carbon-based nanofillers represented by carbon nanotubes are excellent in thermal conductive properties, addition of carbon-based nanofillers to resins have been examined to impart thermal conductive properties to the resins or to improve thermal conductive properties of the resins. The addition of such a carbon-based nanofiller tends to improve the thermal conductive properties. However, the electrical conductive properties are increased, because an electrical conductive path is formed due to contact of pieces of the carbon-based nanofiller in the resin. Hence, it is difficult to obtain a resin composition having high levels of thermal conductive properties and electrical insulating properties simultaneously.

In this respect, the present inventors have proposed a resin composition comprising a carbon-based nanofiller, a modified polyolefin-based polymer, and two or more resins as a resin composition having high levels of thermal conductive properties and electrical insulating properties simultaneously (Japanese Unexamined Patent Application Publication No. 2010-100837 (PTL 4)). In the case of the resin composition, the addition of the modified polyolefin-based polymer makes it possible to localize the carbon-based nanofiller in one of the two or more resins, the one resin forming a dispersed phase. This enables improvement in thermal conductive properties and electrical insulating properties to high levels in a balanced manner. The PTL 4 also discloses that the thermal conductive properties are further improved by using, in combination, a filler having high thermal conductive properties such as alumina and boron nitride.

However, resin parts for electrical or electronic use for automobiles and the like have been required to have higher electrical insulating properties, and also to have high levels of strength, rigidity, and impact resistance simultaneously.

CITATION LIST

Patent Literature

[PTL 1] Japanese Unexamined Patent Application Publication No. 2002-188007
[PTL 2] Japanese Unexamined Patent Application Publication No. 2003-40619
[PTL 3] International Application Japanese-Phase Publication No. 2007-517968
[PTL 4] Japanese Unexamined Patent Application Publication No. 2010-100837

SUMMARY OF INVENTION

Technical Problem

The present invention has been made in view of the above-described problems of the conventional technologies, and an object of the present invention is to provide a resin composition having a good balance of high levels of thermal conductive properties, electrical insulating properties, strength, rigidity, and impact resistance, and also to provide an electrically insulating part obtained from the resin composition.

Solution to Problem

The present inventors have earnestly studied in order to achieve the above described objects. As a result, the present inventors have found that, by using a carbon-based nanofiller and a calcium fluoride in combination and mixing these materials with a resin, it is possible to obtain a resin composition having a good balance of high levels of thermal conductive properties, electrical insulating properties, strength, rigidity, and impact resistance. The finding has led to the completion of the present invention.

Specifically, a resin composition of the present invention comprises 0.1 to 40% by mass of a carbon-based nanofiller (A), 5 to 90% by mass of a resin (B), and 5 to 90% by mass of calcium fluoride (C). In addition, an electrically insulating part of the present invention such as a resin part for a motor (preferably, a stator part for a motor or a rotor part for a motor) or a resin part for a power control unit is obtained from the resin composition.

In the resin composition of the present invention, an average particle diameter of the calcium fluoride (C) is preferably 150 μm or less. The resin (B) preferably comprises two or more resins, and also preferably comprises at least one of a polyolefin-based polymer and a modified polyolefin-based polymer.

Moreover, the resin composition of the present invention preferably further comprises a filler (D) other than the carbon-based nanofiller and than the calcium fluoride.

Note that it is not exactly clear why the use of the carbon-based nanofiller and the calcium fluoride in combination causes the resin composition of the present invention to have a good balance of high levels of thermal conductive properties, electrical insulating properties, strength, rigidity, and impact resistance, but the present inventors speculate as follows. In conventional methods for improving the thermal conductive properties of resins, it is necessary to blend with a resin a large amount of a filler having high thermal conductive properties such as alumina or boron nitride. The addition of such a filler having high thermal conductive properties improves the thermal conductive properties of a resin composition, but the molding processability thereof tends to be deteriorated, and moreover the strength and impact resistance thereof tend to be drastically deteriorated. This is presumably due to the hardness of the above-described filler having high thermal conductive properties. For example, when a thermally conductive filler having a relatively high hardness such as alumina (Mohs hardness 9), aluminum nitride (Mohs hardness 7), or magnesium oxide (Mohs hardness 6.5) is blended with a resin, the strength (tensile strength) and the toughness (impact resistance) tend to be drastically deteriorated. On the other hand, when a thermally conductive filler having a relatively low hardness such as boron nitride (Mohs hardness 2) is blended, the deterioration in toughness (impact resistance) tends to be suppressed, but the improvement in rigidity also tends to be suppressed. Meanwhile, calcium carbonate (Mohs hardness 3) is slightly brittle, and is inferior to calcium fluoride in terms of thermal conductive properties. As described above, the conventionally used fillers having high thermal conductive properties each have both advantages and disadvantages from the viewpoint of improvement in thermal conductive properties, strength, rigidity, and impact resistance. Accordingly, it is difficult to achieve a good balance of high levels of thermal conductive properties, electrical insulating properties, strength, rigidity, and impact resistance.

Moreover, the carbon-based nanofiller used in the present invention is capable of improving the thermal conductive properties and rigidity of a resin composition, but tends to deteriorate the electrical insulating properties thereof. Moreover, calcium fluoride is relatively excellent in thermal conductive properties, and hence is capable of greatly improving the thermal conductive properties of the resin composition. Since calcium fluoride has a moderate hardness (Mohs hardness 4), which is not too hard and not too brittle, the deterioration in strength (tensile strength) and impact resistance is suppressed. However, a great improvement cannot be achieved. In other words, it is difficult to achieve a good balance of high levels of thermal conductive properties, electrical insulating properties, strength, rigidity, and impact resistance by using any one of the carbon-based nanofiller and the calcium fluoride.

In contrast, in the resin composition of the present invention, by using the carbon-based nanofiller and the calcium fluoride in combination, a good balance of high levels of thermal conductive properties, electrical insulating properties, strength, rigidity, and impact resistance are achieved. On the basis of this fact, it is speculated that interaction between the carbon-based nanofiller and the calcium fluoride suppresses the deterioration of the electrical insulating properties, and greatly improves the strength, rigidity, and impact resistance.

Advantageous Effect of Invention

The present invention makes it possible to obtain a resin composition having a good balance of high levels of thermal conductive properties, electrical insulating properties, strength, rigidity, and impact resistance, and also to provide an electrically insulating part obtained from the resin composition.

DESCRIPTION OF EMBODIMENTS

Hereinafter, the present invention is described in detail with reference to preferred embodiments thereof. First, a resin composition of the present invention is described. The resin composition of the present invention comprises a carbon-based nanofiller (A), a resin (B), and calcium fluoride (C). In the resin composition, the use of the carbon-based nanofiller (A) and the calcium fluoride (C) in combination makes it possible to achieve a good balance of high levels of thermal conductive properties, electrical insulating properties, strength, rigidity, and impact resistance.

(A) Carbon-Based Nanofiller

The carbon-based nanofiller (A) used in the present invention is not particularly limited, but examples thereof include anisotropic carbon-based nanofillers such as carbon nanofiber, carbon nanohorn, carbon nanocone, carbon nanotube, carbon nanocoil, carbon nanotwist, carbon nanobaloon, carbon nanowall, carbon nanochapletu, graphene, nanographene, graphene nanoribbon, and derivatives thereof; fullerene and derivatives thereof; and the like. These carbon-based nanofillers may be used alone or in combination of two or more kinds. Of these carbon-based nanofillers, anisotropic carbon-based nanofillers are preferable from the viewpoint that the thermal conductive properties and rigidity of the resin composition are improved. Carbon nanofiber, carbon nanohorn, carbon nanocone, carbon nanotube, carbon nanocoil, carbon nanowall, and carbon nanochaplet are more preferable, and carbon nanofiber, carbon nanohorn, carbon nanotube, and carbon nanocoil are particularly preferable, from the viewpoint that the thermal conductive properties are further improved.

The average diameter of such a carbon-based nanofiller (A) is not particularly limited, but is preferably 1000 nm or less, more preferably 500 nm or less, still preferably 300 nm or less, particularly preferably 200 nm or less, and most preferably 100 nm or less. If the average diameter of the carbon-based nanofiller (A) exceeds the above-described upper limit, the thermal conductive properties, strength, rigidity, and impact resistance of the resin composition tend to be insufficiently improved even when the carbon-based nanofiller (A) and the calcium fluoride (C) are used in combination. From the viewpoint that the thermal conductive properties, strength, rigidity, and impact resistance of the resin composition are improved even with addition in a small amount, the average diameter of the carbon-based nanofiller (A) is preferably small. The lower limit of the average diameter is not particularly limited, but is preferably 0.3 nm or more, more preferably 0.4 nm or more, and particularly preferably 0.5 nm or more.

When the carbon-based nanofiller (A) is an anisotropic carbon-based nanofiller, the aspect ratio (length/diameter) thereof is not particularly limited. However, from the viewpoint that the thermal conductive properties, strength, and rigidity are improved by addition of a small amount in preparation of the resin composition of the present invention, the aspect ratio is preferably 3 or more, more preferably 5 or more, still preferably 10 or more, particularly preferably 40 or more, and most preferably 80 or more.

The carbon-based nanofiller (A) used in the present invention may have a shape like a single trunk or a dendritic shape in which many pieces of the carbon-based nanofiller are outwardly grown like branches. From the viewpoint that the thermal conductive properties, mechanical strength, and the like of the resin composition are improved, the shape is preferably like a single trunk. Moreover, in the present invention, when a carbon nanotube is used as the carbon-based nanofiller (A), any of a single-walled carbon nanotube and multi-walled (double-walled or more) carbon nanotubes can be used. Depending on the application, any of these carbon nanotubes can be suitably selected for use, or can be used in combination. In addition, the carbon-based nanofiller (A) may contain atoms other than carbon atoms or may contain molecules. The carbon-based nanofiller (A) may encapsulate metals or other nanostructures, if necessary.

In the present invention, the ratio (G/D) of a G band to a D band is not particularly limited. Here, among peaks in a raman spectrum obtained by measuring the carbon-based nanofiller (A) by using a raman spectrophotometer, the G band is observed at around 1585 cm$^{-1}$ and attributed to tangential vibration of carbon atoms in a graphene structure, and the D band is observed at around 1350 cm$^{-1}$ in a case where a defect such as a dangling bond is present in the graphene structure. In applications, such as highly thermally conductive resin materials, where high thermal conductive properties are required, the ratio (G/D) is preferably 0.1 or more, more preferably 0.5 or more, still preferably 1.0 or more, particularly preferably 3.0 or more, and most preferably 5.0 or more. If the G/D is less than the lower limit, the thermal conductive properties of the resin composition tend to be insufficiently improved.

Such a carbon-based nanofiller (A) can be produced by appropriately selecting a production method from conventionally-known methods including a laser ablation method, an arc synthesis method, chemical vapor deposition methods (CVD methods) such as a HiPco process, a direct injection pyrolytic synthesis method (DIPS method), a melt-spinning method, and the like, depending on the application. However, the carbon-based nanofiller (A) is not limited to those produced by these methods.

Moreover, in the present invention, it is possible to use, as the carbon-based nanofiller (A), a material in which a substituent such as a carboxyl group, a nitro group, an amino group, an alkyl group, or an organic silyl group, a polymer such as a poly(meth)acrylic acid ester, an electrically conductive polymer such as polyaniline, polypyrrole, polyacetylene, poly(para-phenylene), polythiophene, or poly(phenylene vinylene), or the like is chemically bonded to and thus introduced into a structure of the above-described carbon-based nanofiller, or a material in which a carbon-based nanofiller is covered with another nanofiller.

In the resin composition of the present invention, the content of the carbon-based nanofiller (A) is 0.1 to 40% by mass relative to the total amount (100% by mass) of the resin composition. If the content of the carbon-based nanofiller (A) is less than the lower limit, the thermal conductive properties, strength, rigidity, and impact resistance of the resin composition are deteriorated. On the other hand, if the content exceeds the upper limit, the molding processability is deteriorated. In addition, from the viewpoint that the thermal conductive properties, strength, rigidity, and impact resistance are improved, the lower limit of the content of the carbon-based nanofiller is preferably 0.2% by mass or more, more preferably 0.3% by mass or more, particularly preferably 0.4% by mass or more, and most preferably 0.5% by mass or more. On the other hand, from the viewpoint that the molding processability is improved, the upper limit of the content of the carbon-based nanofiller (A) is preferably 30% by mass or less, more preferably 20% by mass or less, particularly preferably 10% by mass or less, and most preferably 5% by mass or less.

(B) Resin

The resin (B) used in the present invention is not particularly limited, but examples thereof include thermosetting resins including various epoxy resins such as novolac-type epoxy resins and novolac phenol-type epoxy resins, phenol resins, melamine resins, thermosetting imide resins, thermosetting polyamideimides, thermosetting silicone resins, urea resins, unsaturated polyester resins, benzoguanamine resins, alkyd resins, and urethane resins; and thermoplastic resins including aromatic vinyl-based resins such as polystyrene, AS (acrylonitrile-styrene) resins, and methyl methacrylate-acrylonitrile-styrene resins, acrylic-based resins such as polymethyl(meth)acrylate, polyethyl(meth)acrylate, polypropyl(meth)acrylate, polybutyl (meth)acrylate, poly (meth)acrylic acid, and copolymers thereof, vinylcyanide-based resins such as polyacrylonitrile, acrylonitrile-methyl acrylate resins, and acrylonitrile-butadiene resins, imide group-containing vinyl-based resins, polyolefin-based polymers, modified polyolefin-based polymers, modified acrylic-based elastomers, silicone resins, polycarbonates, cyclic polyolefins, polyamides, polyamide elastomers, polyesters such as polyethylene terephthalate, polybutylene terephthalate, and poly(1,4-cyclohexanedimethyl terephthalate), polyester-based elastomers, polyarylates, liquid crystal polyesters, polyarylene ethers, polyarylene sulfides such as polyphenylene sulfide, polysulfones, polyethersulfones, polyoxymethylenes, fluorine resins represented by polytetrafluoroethylene, fluorinated ethylene propylene, polychlorotrifluoroethylene, polyvinylidene fluoride, and polyvinyl fluoride, polylactic acid, polyvinyl chloride, thermoplastic polyimides, thermoplastic polyamideimides, polyetherimides, polyether ether ketones, poly ether ketone ketones, poly ether amides, and the like.

In the present invention, at least one of these resins may be selected as the resin (B). To obtain a resin composition having a good balance of high levels of thermal conductivity and electrical insulating properties, two or more of the above-described resins are preferably used, and three or more of the above-described resins are more preferably used. In addition, a resin comprising any of the above-described thermoplastic resins is preferable as the resin (B). A resin comprising at least one resin selected from polyolefin-based polymers, modified polyolefin-based polymers, polyamides, polyethylene terephthalate, polybutylene terephthalate, poly(1,4-cyclohexanedimethyl terephthalate), liquid crystal polyesters, polyarylene ethers, and polyarylene sulfides is more preferable. A resin comprising at least one resin selected from polyolefin-based polymers, modified polyolefin-based polymers, and polyarylene sulfides is particularly preferable.

As for a combination of such resins, a polyolefin-based polymer and a different resin (preferably a thermoplastic resin, more preferably a polyarylene sulfide) are more preferably used in combination, and a polyolefin-based polymer, a modified polyolefin-based polymer, and a different resin (preferably a thermoplastic resin, more preferably a polyarylene sulfide) are particularly preferably used in combination. When a polyolefin-based polymer and the different resin are used in combination, the electrical insulating properties, strength, and impact resistance of the resin composition tend to be improved. This is presumably because at least a part of the polyolefin-based polymer forms a dispersed phase, and the carbon-based nanofiller (A) is incorporated into the dispersed phase, and localized in the system, so that a linkage structure of the carbon-based nanofiller (A) is less likely to be formed across the entire system. Moreover, when a polyolefin-based polymer, a modified polyolefin-based polymer, and the different resin are used in combination, the electrical insulating properties, strength, and impact resistance of the resin composition tend to be further improved. This is presumably because the addition of the modified polyolefin-based polymer facilitates the formation of a dispersed phase of the polyolefin-based polymer and the formation of a continuous phase of the different resin, and consequently the carbon-based nanofiller (A) is incorporated into the dispersed phase, and highly localized, so that the linkage structure of the carbon-based nanofiller (A) is further less likely to be formed across the entire system.

(Polyolefin-Based Polymer)

The polyolefin-based polymer used in the present invention is not particularly limited, but examples thereof include a homopolymer of an olefinic monomer, a copolymer of two or more olefinic monomers, a copolymer of one or more olefinic monomers and one or more different vinylic monomers, and the like. The structure of the copolymer may be any one of a random structure, a block structure, and a graft structure. Moreover, as the polyolefin-based polymers, any of hydrogenated products and halogenated products (chlorinated products and the like) of the above-described homopolymer and the above-described copolymers can also be used. Such polyolefin-based polymers may be used alone or in combination of two or more kinds. The form of the polyolefin-based polymers may be linear or branched.

The olefinic monomers are not particularly limited, but examples thereof include monoolefinic monomers such as ethylene, propylene, 1-butene, cis-2-butene, trans-2-butene, isobutene, 1-pentene, 2-pentene, 2-methyl-1-butene, 3-methyl-1-butene, 2,3-dimethyl-2-butene, 1-butene, 1-hexene, 1-octene, 1-nonene, and 1-decene; diene monomers such as 1,2-propadiene, methylallene, butadiene, isoprene, 2,3-dimethylbutadiene, 1,3-pentadiene, 1,4-pentadiene, dicyclopentadiene, chloroprene, 1,4-hexadiene, 1,4-cyclohexadiene, 1,5-hexadiene, 5-ethylidene-2-norbornene, and halogenated compounds thereof; and the like. Of such olefinic monomers, monoolefinic monomers are preferable, and ethylene is more preferable, from the viewpoint that the affinity between the obtained polyolefin-based polymer and the carbon-based nanofiller (A) is increased, and the electrical insulating properties and impact resistance of the resin composition are improved.

The different vinylic monomers are not particularly limited, but examples thereof include aromatic vinyl monomers such as styrene, α-methylstyrene, o-methylstyrene, p-methylstyrene, m-methylstyrene, o-ethylstyrene, p-t-butylstyrene, chlorostyrene, chloromethylstyrene, and bromostyrene, (meth)acrylonitrile, methyl (meth)acrylate, ethyl (meth)acrylate, propyl(meth)acrylate, butyl (meth)acrylate, allyl(meth) acrylate, butyl acetate, vinyl acetate, isopropenyl acetate, vinyl chloride, and the like. These different vinylic monomers may be used alone or in combination of two or more kinds.

When an ethylene homopolymer is used as the polyolefin-based polymer, examples thereof include linear low density polyethylene (LLDPE), low density polyethylene (LDPE), high density polyethylene (HDPE), very low density polyethylene (VLDPE) (also called ultra low density polyethylene (ULDPE)), ultra high molecular weight polyethylene (UHMW-PE, generally with a molecular weight of 1.50 million or more), and the like. From the viewpoint that the thermal conductive properties of the resin composition are improved, HDPE is particularly preferable.

Examples of the copolymer of the olefinic monomers include ethylene-based copolymers such as ethylene-propylene copolymers, ethylene-1-butene copolymers, ethylene-4-methyl-1-pentene copolymers, ethylene-1-hexene copolymers, ethylene-propylene-dicyclopentadiene copolymers, ethylene-propylene-5-ethylidene-2-norbornene copolymers, ethylene-propylene-1,4-hexadiene copolymers, ethylene-propylene-1,4-cyclohexadiene copolymers, ethylene-1-octene copolymers, acrylonitrile-ethylene-styrene copolymers, acrylonitrile-chlorinated polyethylene-styrene copolymers, polystyrene-polyethylene/propylene) block copolymers (SEP), polystyrene-polyethylene/propylene)-polystyrene block copolymers (SEPS), polystyrene-poly (ethylene/butylene)-polystyrene block copolymers (SEBS), and polystyrene-poly(ethylene-ethylene/propylene)-polystyrene block copolymers (SEEPS); propylene-based copolymers such as propylene-1-butene-4-methyl-1-pentene copolymers and propylene-1-butene copolymers; styrene-isoprene-styrene block copolymers (SIS); styrene-butadiene-styrene block copolymers (SBS); acrylonitrile-butadiene-styrene copolymers; methyl (meth)acrylate-acrylonitrile-butadiene-styrene copolymers; 1-hexene-4-methyl-1-pentene copolymers; 4-methyl-1-pentene-1-octene copolymers; and the like. When a polypropylene-based polymer is used as the polyolefin-based polymer, any one of isotactic, atactic, and syndiotactic polypropylene-based polymers and the like can be used as the polypropylene-based polymer.

Of such polyolefin-based polymers, ethylene homopolymers and ethylene-based copolymers are preferable, ethylene-based copolymers are more preferable, and ethylene-1-butene copolymers are particularly preferable, from the viewpoint that those polymers have high affinity for the carbon-based nanofiller (A), and consequently the electrical insulating properties and impact resistance of the resin composition are improved.

The melt flow rate (MFR, measured in accordance with JIS K6922-1) of the polyolefin-based polymer is not particularly limited, but is preferably 0.1 g/10 min or more, more preferably 0.2 g/10 min or more, still preferably 1 g/10 min or more, particularly preferably 3 g/10 min or more, and most preferably 10 g/10 min or more. If the MFR of the polyolefin-based polymer is lower than the lower limit, the electrical insulating properties and fluidity of the resin composition tend to be deteriorated. Meanwhile, the upper limit of the MFR of the polyolefin-based polymer is preferably 150 g/10 min or less, more preferably 100 g/10 min or less, and still preferably 80 g/10 min or less. If the MFR of the polyolefin-based polymer exceeds the upper limit, the mechanical properties of the resin composition tend to be deteriorated.

(Modified Polyolefin-Based Polymer)

Examples of the modified polyolefin-based polymer used in the present invention include modified polyolefin-based polymers each having at least one functional group selected from the group consisting of an epoxy group, a carboxyl group, an acid anhydride group, an amino group, an amide group, an oxazoline group, a hydroxyl group, an oxetane group, a mercapto group, a ureido group, and an isocyanate group. Examples of such a modified polyolefin-based polymer include a copolymer of one or more olefinic monomers and one or more vinylic monomers each having the functional group (hereinafter referred to as "functional group-containing vinylic monomers"); a copolymer of one or more olefinic monomers, one or more functional group-containing vinylic monomers, and one or more different vinylic monomers; and the like. The structure of each of these copolymers is not particularly limited, but examples thereof include a random structure, a block structure, a graft structure, and the like. It is also possible to use, as the modified polyolefin-based polymer, a product obtained by adding the functional group to the polyolefin-based polymer, or the like. The modified polyolefin-based polymers may be used alone or in combination of two or more kinds.

Of these modified polyolefin-based polymers, modified polyolefin-based polymers each having at least one functional group selected from the group consisting of an epoxy group, a carboxyl group, an acid anhydride group, an amino group, an oxazoline group, a hydroxyl group, a mercapto group, a ureido group, and an isocyanate group are preferable; modified polyolefin-based polymers each having at least one functional group selected from the group consisting of an epoxy group, a carboxyl group, an acid anhydride group, an amino group, and an isocyanate group are more preferable; modified polyolefin-based polymers each having at least one functional group selected from the group consisting of an epoxy group, a carboxyl group, and an acid anhydride group are particularly preferable; and a modified polyolefin-based polymer having an epoxy group is most preferable, from the viewpoint that the electrical insulating properties and impact resistance of the resin composition are improved.

When at least one different resin is used as the resin (B) in addition to the modified polyolefin-based polymer, the functional group in the modified polyolefin-based polymer is capable of reacting with at least one of terminal groups, side chains, and the main chain of the different resin by heating in a process such as melt-kneading. This reaction results in formation of a graft polymer or a block polymer (preferably a graft polymer), and consequently makes it possible to improve the thermal conductive properties, electrical insulating properties, and impact resistance of the resin composition.

Examples of methods for producing the modified polyolefin-based polymer having such a functional group include a method of copolymerizing an olefinic monomer with a vinylic monomer having the functional group (hereinafter referred to as a "functional group-containing vinylic monomer"), and, if necessary, a different vinylic monomer from these monomers; a method of graft-polymerizing the functional group-containing vinylic monomer onto an unmodified polyolefin-based polymer, if necessary, in the presence of a polymerization initiator such as a radical polymerization initiator; a method of polymerizing an olefinic monomer and, if necessary, the different vinylic monomer, in the presence of a polymerization initiator or a chain transfer agent having the functional group; and the like. The polymerization method for these polymers is not particularly limited, but conventionally-known methods can be suitably employed. In addition, the structure of the obtained copolymer is not particularly limited, but examples thereof include a random structure, a block structure, and a graft structure. Moreover, in the present invention, a commercially-available modified polyolefin-based polymer having the functional group can also be used.

Examples of the olefinic monomer used for the modified polyolefin-based polymer include the monoolefinic monomers and the diene monomers shown as the examples of the polyolefin-based polymer, and the like. These olefinic monomers may be used alone or in combination of two or more kinds. Of these olefinic monomers, one or more monomers including at least ethylene are preferable, and ethylene is more preferable. As a result, the thermal conductive properties of the resin composition tend to be improved. This is presumably because, when a dispersed phase of the polyolefin-based polymer and a continuous phase of the different resin are formed, the addition of the modified polyolefin-based polymer reduces the thermal resistance at the interface between the dispersed phase and the continuous phase.

Examples of the functional group-containing vinylic monomer include unsaturated carboxylic acids such as (meth)acrylic acid, and metal salts thereof; unsaturated dicarboxylic acids such as maleic acid, fumaric acid, itaconic acid, crotonic acid, methylmaleic acid (citraconic acid), methylfumaric acid (mesaconic acid), glutaconic acid, tetrahydrophthalic acid, endo bicyclo-(2,2,1)-5-heptene-2,3-dicarboxylic acid, methyl-1,2,3,6-tetrahydrophthalic acid, 5-norbornene-2,3-dicarboxylic acid, and methyl-5-norbornene-2,3-dicarboxylic acid, and metal salts thereof; mono alkyl esters of the above-described unsaturated dicarboxylic acids such as monomethyl maleate and monoethyl maleate, and metal salts thereof; amino group-containing vinylic monomers such as aminoethyl (meth)acrylate, propylaminoethyl (meth)acrylate, 2-dimethylaminoethyl (meth)acrylate, 2-diethylaminoethyl (meth)acrylate, ethylaminopropyl (meth)acrylate, 2-dibutylaminoethyl (meth)acrylate, 3-dimethylaminopropyl(meth)acrylate, 3-diethylaminopropyl (meth)acrylate, phenylaminoethyl (meth)acrylate, cyclohexylaminoethyl (meth)acrylate, p-aminostyrene, N-vinyldiethylamine, N-acetylvinylamine, allylamine, methallylamine, and N,N-dimethylallylamine; unsaturated carboxylic anhydrides such as maleic anhydride, fumaric anhydride, itaconic anhydride, crotonic anhydride, methylmaleic anhydride, methylfumaric anhydride, mesaconic anhydride, citraconic anhydride, glutaconic anhydride, tetrahydrophthalic anhydride, endo bicyclo-(2,2,1)-5-heptene-2,3-dicarboxylic anhydride, methyl-1,2,3,6-tetrahydrophthalic anhydride, 5-norbornene-2,3-dicarboxylic anhydride, and methyl-5-norbornene-2,3-dicarboxylic anhydride; epoxy group-containing vinylic monomers such as glycidyl(meth)acrylate, glycidyl ethacrylate, glycidyl maleate, glycidyl fumarate, glycidyl itaconate, glycidyl crotonate, glycidyl citraconate, glycidyl glutaconate, p-glycidylstyrene, allyl glycidyl ether, and styrene-p-glycidyl ether; oxazoline group-containing vinylic monomers such as 2-isopropenyl-oxazoline, 2-vinyl-oxazoline, 5-methyl-2-vinyl-oxazoline, 2-acryloyl-oxazoline, 2-styryl-oxazoline, 4,4-dimethyl-2-vinyl-oxazoline, and 4,4-dimethyl-2-isopropenyl-oxazoline; amide group-containing vinylic monomers such as (meth)acrylamide, N-methylacrylamide, butoxymethylacrylamide, and N-propyl methacrylamide; hydroxyl group-containing vinylic monomers such as 2-hydroxyethyl (meth)acrylate, 3-hydroxypropyl(meth)acrylate, 2,3,4,5,6-pentahydroxyhexyl(meth)acrylate, 2,3,4,5-tetrahydroxypentyl(meth)acrylate, 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene, and 4-dihydroxy-2-butene; and the like. These functional group-containing vinylic monomers may be used alone or in combination of two or more kinds. Of these functional group-containing vinylic monomers, epoxy group-containing vinylic monomers are preferable from the viewpoint that the electrical insulating properties and impact resistance of the resin composition are improved.

The different vinylic monomers used for the modified polyolefin-based polymer according to the present invention are not particularly limited, but examples thereof include aromatic vinylic monomers such as styrene, α-methylstyrene, o-methylstyrene, p-methylstyrene, m-methylstyrene, o-ethylstyrene, p-t-butylstyrene, chlorostyrene, chloromethylstyrene, and bromostyrene, (meth)acrylonitrile, methyl (meth)acrylate, ethyl (meth)acrylate, propyl(meth)acrylate, butyl (meth)acrylate, allyl(meth)acrylate, N-phenyl maleimide, N-methyl maleimide, butyl acetate, vinyl acetate, isopropenyl acetate, vinyl chloride, and the like. These different vinylic monomers may be used alone or in combination of two or more kinds.

In the modified polyolefin-based polymer, the content percentage of the functional group-containing vinylic monomer unit is preferably 0.01% by mass or more, more preferably 0.1% by mass or more, still preferably 0.5% by mass or more, particularly preferably 1% by mass or more, and most preferably 8% by mass or more, relative to all constitutional units in the modified polyolefin-based polymer. On the other hand, the content percentage of the functional group-containing vinylic monomer unit is preferably 99% by mass or less, more preferably 80% by mass or less, still preferably 70% by mass or less, particularly preferably 60% by mass or less, and most preferably 50% by mass or less. If the content percentage of the functional group-containing vinylic monomer unit is less than the lower limit, the thermal conductive properties and electrical insulating properties of the resin composition tend to be insufficiently improved. On the other hand, if the content percentage exceeds the upper limit, the molding processability of the resin composition tends to be deteriorated.

(Polyarylene Sulfide)

In the present invention, a conventionally known polyarylene sulfide can be used as the polyarylene sulfide, and for example any of linear polyarylene sulfides, cross-linked polyarylene sulfides and mixtures thereof can be used. Of these polyarylene sulfides, p-phenylene sulfide homopolymers and m-phenylene sulfide (co)polymers are preferable.

The melt viscosity (temperature: 310° C., shear rate: 1200 $s^{-1}$) of the polyarylene sulfide is preferably 3000 Pa·s or less, more preferably 1000 Pa·s or less, still preferably 300 Pa·s or less, particularly preferably 100 Pa·s or less, and most preferably 50 Pa·s or less, from the viewpoint that the electrical insulating properties of the resin composition are improved. The lower limit of the melt viscosity of the polyarylene sulfide is not particularly limited, but is preferably 1 Pa·s or more, more preferably 3 Pa·s or more, still preferably 5 Pa·s or more, and particularly preferably 10 Pa·s or more, from the viewpoint that the mechanical properties of the resin composition are improved. In the present invention, a mixture of plural polyarylene sulfides having mutually different melt viscosities is also preferably used.

It is also possible to add, to the resin composition of the present invention, bisphenol A, bisphenol F, bisphenol S, an epoxy group-containing organic silane, an isocyanate group-containing organic silane, resorcinol, hydroquinone, pyrocatechol, diphenyldimethylmethane, 4,4'-dihydroxybiphenyl, 1,3,5-trihydroxybenzene, 1,5-dihydroxynaphthalene, cashew phenol, 2,2,5,5-tetrakis(4-hydroxyphenyl)hexane, salicyl alcohol, a bisphenol A-type epoxy compound such as bisphenol A-diglycidyl ether, a glycidyl ester-based epoxy compound such as glycidyl phthalate, a glycidyl amine-based epoxy compound such as N-glycidylaniline, or the like. These compounds may be used alone or in combination of two or more kinds.

In the resin composition of the present invention, the content of the resin (B) is generally 5 to 90% by mass relative to the total amount (100% by mass) of the resin composition. The lower limit of the content of the resin (B) is preferably 10% by mass or more, more preferably 15% by mass or more, still preferably 20% by mass or more, and particularly preferably 25% by mass or more. Meanwhile, the upper limit of the content of the resin (B) is preferably 85% by mass or less, more preferably 80% by mass or less, still preferably 70% by mass or less, particularly preferably 60% by mass or less, and most preferably 50% by mass or less.

In the resin composition of the present invention, particularly in cases where the polyolefin-based polymer and the different resin are used as the resin (B) in combination (including cases where the modified polyolefin-based polymer is further used in combination), the lower limit of the content of the polyolefin-based polymer is preferably 0.5% by mass or more, more preferably 1% by mass or more, still preferably 2% by mass or more, particularly preferably 2.5% by mass or more, and most preferably 3% by mass or more, relative to the total amount (100% by mass) of the resin composition, from the viewpoint that the thermal conductive properties, electrical insulating properties, and impact resistance of resin composition are improved in a balanced manner. On the other hand, the upper limit of the content of the polyolefin-based polymer is preferably 50% by mass or less, more preferably 40% by mass or less, still preferably 30% by mass or less, particularly preferably 20% by mass or less, and most preferably 15% by mass or less, relative to the total amount (100% by mass) of the resin composition, from the viewpoint that the electrical insulating properties of the resin composition are improved.

In the resin composition of the present invention, in cases where the modified polyolefin-based polymer and the different resin are used in combination as the resin (B) (including cases where the polyolefin-based polymer is further used in combination), the lower limit of the content of the modified polyolefin-based polymer is preferably 0.1% by mass or more, more preferably 0.3% by mass or more, still preferably 0.5% by mass or more, and particularly preferably 1% by mass or more, relative to the total amount (100% by mass) of the resin composition, from the viewpoint that the electrical insulating properties of the resin composition are sufficiently improved. On the other hand, the upper limit of the content of the modified polyolefin-based polymer is preferably 50% by mass or less, more preferably 40% by mass or less, still preferably 30% by mass or less, particularly preferably 20% by mass or less, and most preferably 10% by mass or less, relative to the total amount (100% by mass) of the resin composition, from the viewpoint that the molding processability of the resin composition is secured.

Note that when the different resin is used in combination with the polyolefin-based polymer and/or the modified polyolefin-based polymer as described above, the content of the different resin is the rest of the resin (B). The lower limit of the content of the different resin is preferably 10% by mass or more, more preferably 15% by mass or more, particularly preferably 20% by mass or more, and most preferably 30% by mass or more, relative to the total amount (100% by mass) of the resin composition. On the other hand, the upper limit of the content of the different resin is preferably 85% by mass or less, more preferably 80% by mass or less, still preferably 70% by mass or less, particularly preferably 60% by mass or less, and most preferably 50% by mass or less, relative to the total amount (100% by mass) of the resin composition.

(C) Calcium Fluoride

The calcium fluoride (C) used in the present invention is not particularly limited, but examples thereof include untreated calcium fluoride, calcium fluoride treated with a surface treatment agent such as an organic silane, an organic titanate, an organic aluminate. The use of such calcium fluoride (C) in combination with the carbon-based nanofiller (A) brings about the following effects. Specifically, the resin composition exhibits high electrical insulating properties, even though the carbon-based nanofiller (A), whose addition in a small amount improves the electrical conductivity of the resin, is contained. In addition, the thermal conductive properties, strength, rigidity, and impact resistance are improved.

As a result, a good balance of high levels of thermal conductive properties, electrical insulating properties, strength, rigidity, and impact resistance of the resin composition can be achieved. Furthermore, since calcium fluoride used in the present invention is less expensive than conventional fillers having high thermal conductive properties, the resin composition of the present invention can be produced at low costs.

The organic silane is not particularly limited, but examples thereof include conventional known organic silanes such as epoxy-modified organic silanes, amino group-modified organic silanes, acrylic-modified organic silanes, and isocyanate group-modified organic silanes.

The average particle diameter of the calcium fluoride (C) is not particularly limited, but is preferably 500 μm or less, more preferably 150 μm or less, still preferably 80 μm or less, particularly preferably 50 μm or less, and most preferably 20 μm or less. If the average particle diameter of the calcium fluoride (C) exceeds the upper limit, it tends to be difficult to obtain a resin composition having all of thermal conductive properties, electrical insulating properties, strength, rigidity, and impact resistance in high levels and a balanced manner, even when the carbon-based nanofiller (A) and the calcium fluoride (C) are used in combination. In addition, from the viewpoint that the thermal conductive properties, electrical insulating properties, strength, and impact resistance of the resin composition are improved, the average particle diameter of the calcium fluoride (C) is preferably small. The lower limit thereof is not particularly limited, but is preferably 0.1 μm or more, and more preferably 1 μm or more. It is also possible to use, as the calcium fluoride (C), two or more kinds having mutually different average particle diameters in combination.

A method for producing such calcium fluoride (C) is not particularly limited, but examples thereof include a method in which the calcium fluoride (C) is obtained by ore dressing; a method in which the calcium fluoride (C) is regenerated as the calcium salt from a waste liquid of a fluorine-containing compound such as hydrofluoric acid used in manufacturing semiconductors or the like; and the like.

In the resin composition of the present invention, the content of the calcium fluoride (C) is 5 to 90% by mass relative to the total amount (100% by mass) of the resin composition. If the content of the calcium fluoride (C) is less than the lower limit, the thermal conductive properties and electrical insulating properties of the resin composition are deteriorated. On the other hand, if the content exceeds the upper limit, the molding processability is deteriorated. In addition, from the viewpoint that the thermal conductive properties and electrical insulating properties are improved, the lower limit of the content of the calcium fluoride (C) is preferably 10% by mass or more, more preferably 15% by mass or more, still preferably 20% by mass or more, particularly preferably 25% by mass or more, and most preferably 30% by mass or more. On the other hand, the upper limit of the content of the calcium fluoride (C) is preferably 85% by mass or less, more preferably 80% by mass or less, still preferably 75% by mass or less, particularly preferably 70% by mass or less, and most preferably 65% by mass or less, from the viewpoint that the molding processability is improved.

(D) Filler

The resin composition of the present invention may comprise a filler other than the carbon-based nanofiller (A) and than the calcium fluoride (C), if necessary. Any filler such as a fibrous filler or a non-fibrous filler (a particulate filler or the like) can be used as the filler (D). From the viewpoint that the rigidity, heat resistance, and dimensional stability of the resin composition are improved, a fibrous filler is preferable.

The fibrous filler is not particularly limited, but examples thereof include glass fiber, carbon fiber, metal fiber (for example, iron, stainless steel, nickel, copper, silver, gold, or titanium), aramide fiber, alumina fiber, silicon carbide fiber, cellulose fiber, asbestos, wollastonite, whisker (for example, potassium titanate whisker, zinc oxide whisker, calcium sulfate whisker, calcium carbonate whisker, and aluminum borate whisker), and the like. Of these fibrous fillers, glass fiber, carbon fiber, wollastonite, and whisker are preferable. From the viewpoint of improvement in strength and impact resistance, glass fiber is particularly preferable.

When glass fiber is used as the fibrous filler contained in the resin composition of the present invention, the average diameter of the glass fiber is not particularly limited, but is preferably 50 μm or less, more preferably 15 μm or less, still preferably 12.5 μm or less, particularly preferably 12 μm or les, and most preferably 11 μm or less, from the viewpoint that the strength and rigidity of the resin composition are improved. Meanwhile, the lower limit of the average diameter of the fibrous filler is not particularly limited, but is preferably 0.5 μm or more, more preferably 1 μm or more, and particularly preferably 2 μm or more.

When glass fiber is used as the fibrous filler, the average long axis length thereof is not particularly limited, but is preferably 10 mm or less, more preferably 5 mm or less, and particularly preferably 1000 μm or less. If the average long axis length of the fibrous filler exceeds the upper limit, the rigidity, impact resistance, and dimensional stability of the resin composition tend to be deteriorated. In addition, the lower limit of the average long axis length of the fibrous filler is not particularly limited, but is preferably 1 μm or more, more preferably 5 μm or more, and particularly preferably 10 μm or more.

The non-fibrous filler is not particularly limited, but examples thereof include glass flake, glass beads, clay minerals represented by talc and montmorillonite, layered silicates represented by mica (isinglass) minerals and kaolinite minerals, silica, magnesium carbonate, silicon oxide, calcium oxide, zirconium oxide, calcium sulfate, barium sulfate, titanium oxide, aluminum oxide, dolomite, and the like.

The average particle diameter of the non-fibrous filler is not particularly limited, but is preferably 1000 μm or less, more preferably 500 μm or less, still preferably 200 μm or less, particularly preferably 100 μm or less, and most preferably 50 μm or less. If the average particle diameter of the non-fibrous filler exceeds the upper limit, the electrical insulating properties of the resin composition tend to be deteriorated. In addition, from the viewpoint that the rigidity of the resin composition is improved, the average particle diameter of the non-fibrous filler is preferably small. The lower limit thereof is not particularly limited, but is preferably 0.5 μm or more, more preferably 1 μm or more, and particularly preferably 2 μm or more.

In the resin composition of the present invention, the content of the filler (D) is not particularly limited, but the lower limit thereof is preferably 0.05% by mass or more, more preferably 0.1% by mass or more, still preferably 1% by mass or more, particularly preferably 5% by mass or more, and most preferably 10% by mass or more relative to the total amount (100% by mass) of the resin composition. On the other hand, the upper limit of the content of the filler (D) is preferably 70% by mass or less, more preferably 60% by mass or less, still preferably 55% by mass or less, and particularly preferably 50% by mass or less relative to the total amount (100% by mass) of the resin composition.

(Thermally Conductive Filler)

The resin composition of the present invention may comprise a thermally conductive filler in addition to the calcium fluoride (C) and the filler (D), as long as the effects of the invention are not impaired. Examples of such a thermally conductive filler include alumina, boron nitride, aluminum nitride, silicon nitride, silicon carbide, crystalline silica, fused silica, diamond, zinc oxide, magnesium oxide, calcium carbonate, soft magnetic ferrite, and the like. The shape thereof is not particularly limited, but examples thereof include a particulate form, a tabular form, a rod shape, a fiber form, a tube form and the like. These thermally conductive fillers may be used alone or in combination of two or more kinds.

The thermal conductivity of the thermally conductive filler is not particularly limited, but is preferably 1 W/m·K or more, more preferably 3 W/m·K or more, still preferably 5 W/m·K or more, particularly preferably 10 W/m·K or more, and most preferably 20 W/m·K or more.

(Other Additives)

The resin composition of the present invention may also comprise an electrically conductive material such as a metal, a metal compound represented by a metal oxide and a metal hydroxide, carbon black, graphite, or an electrically conductive polymer such as polyaniline, polypyrrole, polyacetylene, poly(para-phenylene), polythiophene, or poly(phenylene vinylene); a filler coated with the electrically conductive material; or the like. The metal is not particularly limited, but examples thereof include gold, silver, copper, aluminum, iron, platinum, magnesium, molybdenum, rhodium, zinc, palladium, tungsten, chromium, cobalt, nickel, tin, titanium, metal silicon, and the like; alloys thereof; and the like. The shape of the metal and the metal compound is not particularly limited, but examples thereof include a particulate form, a tabular form, a rod shape, a tube form, and the like.

Further, another component may be added to the resin composition of the present invention, and examples thereof include metal salt stabilizing agents such as copper chloride, copper(I) iodide, copper acetate, and cerium stearate; antioxidants such as hindered amine-based, hindered phenol-based, sulfur-containing compound-based, and acrylate-based antioxidants, and phosphorus-based organic compounds; heat stabilizers; benzophenone-based, salicylate-based, benzotriazole-based ultraviolet absorbers and weathering agents; light stabilizers; mold release agents; lubricants; nucleating agents; viscosity modifiers; colorants; surface treatment agents such as silane-coupling agents; pigments; fluorescent pigments; dyes; fluorescent dyes; color protection agents; plasticizers; flame retardants (red phosphorus, metal hydroxide-based flame retardants, phosphorus-based flame retardants, silicone-based flame retardants, halogen-based flame retardants, combinations of these halogen-based flame retardants and antimony trioxide, and the like); wood powder; hull powder; nut powder; used paper; phosphorescent pigments; borate glass; antibacterial agents such as silver-based antibacterial agents; antifungal agents; and corrosion prevention agents for mold such as magnesium-aluminum hydroxy hydrates.

<Resin Composition and Method for Producing the Same>

Next, a method for producing the resin composition of the present invention is described. Examples of the method for producing the resin composition of the present invention include a method of uniformly mixing the carbon-based nanofiller (A), the resin (B) (preferably two or more resins), the calcium fluoride (C), and, if necessary, the filler (D) and the other additive by use of a high-speed agitator or the like, and then mixing the mixture by means of melt-kneading using a single-screw or multiple-screw extruder having a sufficient kneading capability and being provided with a vent; a method of mixing the above-mentioned components by means of melt-kneading using a Banbury mixer or a rubber roller; and the like.

The shape of each of the components is not particularly limited, but a component may be used in any form of a pellet form, a powder form, a small piece form, and the like. Other examples of the method for producing the resin composition of the present invention include a method of mixing all components at once; a method of premixing specific components, and then mixing the premixed components with the remaining components; and the like. For example, when the polyolefin-based polymer, the modified polyolefin-based polymer, and the different resin are used as the resin (B) in combination, a method can be selected as appropriate from various mixing methods such as (1) a method of mixing all components at once; and (2) a method of premixing the carbon-based nanofiller (A), the polyolefin-based polymer, and the modified polyolefin-based polymer, and then mixing the premixed components with the other components. An example of the production method (1) is a method in which a mixture containing all the components is introduced into an extruder, and then melt-kneaded. Meanwhile, an example of the production method (2) is a method in which a mixture of the carbon-based nanofiller (A), the polyolefin-based polymer, and the modified polyolefin-based polymer is fed through an upstream hopper of an extruder provided with one or multiple side feeders, and melt kneaded in advance, and thereafter, each remaining component is fed through the one or multiple side feeders, and then melt-kneaded.

The thus obtained resin composition of the present invention has a good balance of high levels of thermal conductive properties, electrical insulating properties, strength, rigidity, and impact resistance. For example, the thermal conductivity in the thickness direction of a molded product with a thickness of 0.3 mm, which is measured by a periodic heating method, is preferably 0.4 W/mK or more, more preferably 0.5 W/mK or more, still preferably 0.6 W/mK or more, particularly preferably 0.7 W/mK or more, and most preferably 0.8 W/mK or more. The breakdown voltage is preferably 3.5 kV/mm or more, more preferably 5 kV/mm or more, still preferably 10 kV/mm or more, particularly preferably 13 kV/mm or more, and most preferably 16 kV/mm or more. The tensile strength is preferably 80 MPa or more, more preferably 85 MPa or more, still preferably 90 MPa or more, particularly preferably 95 MPa or more, and most preferably 100 MPa or more. The storage elastic modulus at 20° C. is preferably 8.5 GPa or more, more preferably 9.0 GPa or more, still preferably 9.5 GPa or more, particularly preferably 10.0 GPa or more, and most preferably 10.5 GPa or more. The Charpy impact strength measured at 23° C. is preferably 4.0 kJ/m$^2$ or more, more preferably 4.5 kJ/m$^2$ or more, still preferably 5.0 kJ/m' or more, and particularly preferably 5.5 kJ/m$^2$ or more.

Note that, in the resin composition of the present invention, it is not exactly clear why the thermal conductivity, electrical insulating properties, and impact resistance of the resin composition are further improved when the polyolefin-based polymer and the different resin are used in combination as the resin (B), but the present inventors speculate as follows. Specifically, it is presumed that, in the mixture system of the polyolefin-based polymer and the different resin, at least a part of the polyolefin-based polymer forms a dispersed phase. Since the affinity of the polyolefin-based polymer for the carbon-based nanofiller (A) is relatively high, it is presumed that the carbon-based nanofiller (A) is incorporated into the dispersed phase, and the carbon-based nanofiller (A) is in a localized state when the system is considered as a whole. As a result, it is presumed that the formation of the linkage structure of the carbon-based nanofiller (A) across the entire system is suppressed, and hence the electrical insulating properties are further improved.

Moreover, in the resin composition of the present invention, it is not exactly clear why the electrical insulating properties of the resin composition are remarkably improved when the polyolefin-based polymer, the modified polyolefin-based polymer, and the different resin are used in combination as the resin (B), but the present inventors speculate as follows. Specifically, it is presumed that, in the mixture system of the polyolefin-based polymer, the modified polyolefin-based polymer, and the different resin, the modified polyolefin-based polymer having a lower affinity for the carbon-based nanofiller (A) than the polyolefin-based polymer is present at an interface between a dispersed phase formed from the polyolefin-based polymer and a continuous phase formed from the different resin. In such a system, it is presumed that the carbon-based nanofiller (A) is further efficiently incorporated into the dispersed phase, and the carbon-based nanofiller (A) is in a further localized state when the system is considered as a whole. As a result, it is presumed that the formation of the linkage structure of the carbon-based nanofiller (A) across the entire system is further suppressed, and hence the electrical insulating properties are remarkably improved.

For example, the electrical insulating properties of the resin composition tend to be extremely excellent, when a polyethylene-based polymer, an epoxy-modified polyethylene-based polymer, and a polyphenylene sulfide are used in combination as the resin (B). Although it is not exactly clear why the extremely excellent electrical insulating properties are achieved, the present inventors speculate as follows. Specifically, it is presumed that, in this system, the polyethylene-based polymer forms a dispersed phase, the polyphenylene sulfide forms a continuous phase, and the epoxy-modified polyethylene-based polymer is present at an interface between the dispersed phase and the continuous phase. It is also presumed that SNa groups which are terminal groups of the polyphenylene sulfide, SH groups generated from the SNa groups by an acid treatment or the like, amino groups or carboxyl groups introduced during the production thereof or by a post treatment where necessary, or terminal groups formed as a result of a reaction of N-methylpyrrolidone used for the production react in situ with epoxy groups of the epoxy-modified polyethylene-based polymer during a process such as melt-kneading. It is presumed that since a part or all of reaction product formed by this reaction are present stably at the interface between the dispersed phase and the continuous phase, the carbon-based nanofiller (A) is efficiently incorporated into the dispersed phase formed from the polyethylene-based polymer, and the carbon-based nanofiller (A) is in a remarkably localized state when the system is considered as a whole. As a result, it is presumed that the formation of the linkage structure of the carbon-based nanofiller (A) across the entire system is further suppressed, and the electrical insulating properties are remarkably improved.

A method for processing such a resin composition of the present invention into a molded product is not particularly limited, but a melt-molding process is preferable. Examples of such a melt-molding method include conventionally-known molding methods such as injection molding, extrusion molding, blow molding, press molding, compression molding (injection and compression molding, and the like), and gas-assist molding. The orientation of the carbon-based nanofiller (A) and the resin (B) can be controlled by application of a magnetic field, an electric field, or an ultrasonic wave, by stretching, or the like, during the molding process.

<Insulating Part>

An electrically insulating part of the present invention is obtained from the above-described resin composition of the present invention, and is preferably obtained by processing the resin composition of the present invention with a melt molding. Examples of electrically insulating parts to which the resin composition of the present invention is preferably applied include resin parts for motors, housings for motors, resin parts for power control units, wiring substrates for semiconductors, lamp housings (LED lamp housings and the like), materials for batteries, various cases, various covers, and the like. Of these electrically insulating parts, resin parts for motors, resin parts for power control units are more preferably, from the viewpoint that the resin composition of the present invention achieves a good balance of high levels of thermal conductive properties, electrical insulating properties, strength, rigidity, and impact resistance.

Note that examples of the resin parts for motors include stator parts for motors (for example, electrical insulator materials, coil-sealing materials, and coating materials), rotor parts for motors, and the like. Meanwhile, examples of the resin parts for power control units include sealing members for reactors, power devices (electrically insulating boards), and the like.

EXAMPLES

Hereinafter, the present invention is described more specifically on the basis of Examples and Comparative Examples. However, the present invention is not limited to the following Examples. Note that physical properties of obtained resin compositions were measured in accordance with the following methods.

(1) Thermal Conductivity

A molded product with a thickness of 1 mm was obtained by press-molding a pelletized resin composition at 300° C. A sample of 25 mm×25 mm×1 mm was cut out of the molded product. The thermal conductivity (W/mK) in the thickness direction of the sample (a portion having a thickness of 1 mm) was measured at 40° C. (the temperature difference between upside and downside was 24° C.) by use of a steady method thermal conductivity measuring instrument ("GH-1" manufactured by ULVAC-RIKO, Inc.).

(2) Breakdown Voltage

A molded product with a thickness of 1 mm was obtained by press-molding a pelletized resin composition at 300° C. An electrically conductive paste ("Dotite FA-705BN" manufactured by Fujikura Kasei Co. Ltd., filler: Ag) was applied by screen-printing onto a front and back surfaces of the molded product so that diameters of the applied areas were 15 mm and a diameter of 17 mm, respectively. Then, the electrically conductive paste was adhered by a thermal curing process conducted at 150° C. for 1 hour in a hot-air drier, and thereby electrodes were fabricated. The breakdown voltage of the molded product with the electrodes was measured in a silicone oil ("SRX310" manufactured by Dow Corning Toray Silicone Co., Ltd.) at a rate of voltage rise of 0.05 kV/sec and at room temperature by use of an ultra-high withstand voltage tester ("Model 7474" manufactured by Keisoku Giken Co., Ltd.). A voltage at which insulation breakdown occurred was regarded as the breakdown voltage (kV/mm). Note that when a molded product with a thickness of 1 mm was used, the maximum measurable value of the breakdown voltage was 20 kV/mm. When no insulation breakdown was observed at 20 kV/mm, the breakdown voltage was represented as ">20 kV/mm".

(3) Tensile Strength

An ISO test piece with a thickness of 4 mm was obtained by injection-molding a pelletized resin composition at a resin temperature of 320° C. and a mold temperature of 135° C. The tensile strength (MPa) of the ISO test piece was measured by use of a universal testing machine "AG-1" manufactured by Shimadzu Corporation at a tensile speed of 2 mm/min and at a temperature of 23° C.

(4) Storage Elastic Modulus

A test piece of 4 mm in width×40 mm in length×1 mm in thickness was obtained by press-molding a pelletized resin composition at 300° C. The storage elastic modulus (GPa) of the test piece at 20° C. was determined by conducting a dynamic viscoelasticity measurement by use of a dynamic viscoelasticity measuring apparatus ("itk DVA-220" manufactured by IT Keisoku Seigyo Co., Ltd.) under the following conditions: temperature range: −150° C. to 200° C.; rate of temperature rise: 5° C./min, deformation mode: tension; strain: 0.05%; measurement frequency: 10 Hz; and distance between chucks: 25 mm.

(5) Charpy Impact Strength

A molded product of 80 mm×10 mm×4 mm was obtained by injection-molding a pelletized resin composition at a resin temperature of 320° C. and a mold temperature of 135° C. In this molded product, a notch (single notch, V notch, notch angle: 45°, notch depth: 2 mm) was formed by cutting to obtain a notched test piece. The Charpy impact strength (kJ/m$^2$) of the test piece was measured at 23° C. by use of a digital impact tester ("DG-UB JIS" manufactured by Toyo Seiki Seisaku-sho, Ltd.).

The followings are carbon-based nanofillers (A), resins (B), calcium fluorides (C), and fillers (D) used in Examples and Comparative Examples, and thermally conductive fillers used in Comparative Examples. Note that, the G/D value of each carbon-based nanofiller (A) was determined from the intensities of peaks of the G band observed at around 1585 cm$^{-1}$ and the D band observed at around 1350 cm$^{-1}$ in a Raman spectrum measured at an excitation laser wavelength of 532 nm by use of a laser Raman spectroscopy system ("NRS-3300" manufactured by JASCO Corporation).

(A) Carbon-Based Nanofiller

Carbon-Based Nanofiller (a-1)

Carbon nanofiber ("VGCF-S" manufactured by Showa Denko K. K., average diameter: 80 nm, aspect ratio: 100 or more, G/D value: 10.0).

Carbon-Based Nanofiller (a-2)

Carbon nanofiber ("VGCF" manufactured by Showa Denko K. K., average diameter: 150 nm, aspect ratio: 60, G/D value: 10.0).

(B) Resin

Resin (b-1)

Polyethylene ("Sunfine LH-311" manufactured by Asahi Kasei Chemicals Corporation, high density polyethylene, specific gravity: 0.97, MFR (measured in accordance with JIS K7210): 18 g/10 min).

Resin (b-2)

Ethylene butene copolymer ("TAFMER A350709" manufactured by Mitsui Chemicals, Inc.).

Resin (b-3)

Epoxy-modified polyethylene ("BONDFAST-E" manufactured by Sumitomo Chemical Company, Limited (content of glycidyl methacrylate: 12% by weight).

Resin (b-4)

Polyphenylene sulfide ("FORTRON W202A" manufactured by Kureha Corporation, a linear polyphenylene sulfide having a melt viscosity of 20 Pa·s at a temperature of 310° C. and at a shear rate of 1200 s$^{-1}$).

(C) Calcium Fluoride

Calcium Fluoride (c-1) manufactured by Kinsei Matec Co., Ltd., average
particle diameter: 8 µm.

Calcium Fluoride (c-2)
manufactured by Morita Chemical Industries Co., Ltd., average particle diameter: 30 µm.

Calcium Fluoride (c-3)
manufactured by Morita Chemical Industries Co., Ltd., average particle diameter: 100 µm.

Calcium Fluoride (c-4)
manufactured by Stella Chemifa Corporation, average particle diameter: 200 µm.

Calcium Fluoride (c-5)
manufactured by Kinsei Matec Co., Ltd., average particle diameter: 300 µm.

(D) Filler

Fibrous filler (d-1)
Glass fiber ("ECS03-631K" manufactured by Central Glass Co., Ltd., average diameter: 13 µm).

Fibrous Filler (d-2)
Glass fiber ("ECS03T-717H" manufactured by Nippon Electric Glass Co., Ltd., average diameter: 10.5 µm).

Fibrous Filler (d-3)
Carbon fiber ("TORAYCA T008-006" manufactured by Toray Industries, Inc., average diameter: 7 µm).

(Thermally Conductive Filler)

Thermally Conductive Filler (e-1)
Heavy calcium carbonate (manufactured by Maruo Calcium Co., Ltd., average particle diameter: 12 µm).

Thermally Conductive Filler (e-2)
High-purity synthetic spherical alumina ("Admafine AO-800" manufactured by Admatechs, average particle diameter: 6 µm).

Thermally Conductive Filler (e-3)
Spherical boron nitride ("FS-3" manufactured by Mizushima Ferroalloy Co., Ltd., average particle diameter: 50 µm).

Example 1

Relative to 100% by mass of the total amount of all components, 0.6% by mass of the carbon-based nanofiller (a-1), 39.4% by mass of the resin (b-4), 30% by mass of the calcium fluoride (c-1), and 30% by mass of the fibrous filler (d-2) were blended as shown in Table 1. The blended components were fed into a twin-screw extruder ("TEX30" from The Japan Steel Works, Ltd.), and melt-kneaded at a barrel setting temperature of 310° C. and at a screw rotation rate of 200 rpm. The kneaded material was extruded into a strand shape, and cut with a strand cutter after being cooled. Thus, a resin composition in a pellet form was obtained. The pelletized resin composition was vacuum-dried at 130° C. for 6 hours, and then measured for the above-described physical properties. The results are shown in Table 2.

Examples 2 to 17

Each resin composition in a pellet form was obtained in the same manner as in Example 1, except that the carbon-based nanofiller (A), the resin (B), the calcium fluoride (C) and the filler (D) of the kinds shown in Table 1 were used in the blending amounts shown in Table 1. The pelletized resin composition was vacuum-dried at 130° C. for 6 hours, and then measured for the above-described physical properties. The results are shown in Table 2.

Comparative Examples 1 to 15

Each resin composition in a pellet form was obtained in the same manner as in Example 1, except that the carbon-based nanofiller (A), the resin (B), the calcium fluoride (C), the filler (D), and the thermally conductive filler of the kinds shown in Table 3 were used in the blending amounts shown in Table 3. The pelletized resin composition was vacuum-dried at 130° C. for 6 hours, and then measured for the above-described physical properties. The results are shown in Table 4.

TABLE 1

| | Carbon-based nanofiller (A) | | Resin (B) | | | | | | Calcium fluoride (C) | | Filler (D) | | Thermally conductive filler | |
|---|---|---|---|---|---|---|---|---|---|---|---|---|---|---|
| | Kind | % by mass | Kind | % by mass | Kind | % by mass | Kind | % by mass | Kind | % by mass | Kind | % by mass | Kind | % by mass |
| Ex. 1 | a-1 | 0.6 | — | — | — | — | b-4 | 39.4 | c-1 | 30 | d-2 | 30 | — | — |
| Ex. 2 | a-1 | 0.5 | b-1 | 4.2 | b-3 | 2.4 | b-4 | 25.9 | c-1 | 37 | d-1 | 30 | — | — |
| Ex. 3 | a-1 | 0.5 | b-2 | 4.2 | b-3 | 2.4 | b-4 | 25.9 | c-1 | 37 | d-1 | 30 | — | — |
| Ex. 4 | a-1 | 0.5 | b-1 | 4.2 | b-3 | 2.4 | b-4 | 25.9 | c-1 | 37 | d-2 | 30 | — | — |
| Ex. 5 | a-1 | 0.5 | b-2 | 4.2 | b-3 | 2.4 | b-4 | 25.9 | c-1 | 37 | d-2 | 30 | — | — |
| Ex. 6 | a-1 | 0.5 | b-2 | 4.2 | b-3 | 2.4 | b-4 | 22.9 | c-1 | 35 | d-2 | 35 | — | — |
| Ex. 7 | a-1 | 0.6 | b-1 | 5.5 | b-3 | 1.8 | b-4 | 32.1 | c-1 | 30 | d-1 | 30 | — | — |
| Ex. 8 | a-1 | 0.6 | b-2 | 5.5 | b-3 | 1.8 | b-4 | 32.1 | c-1 | 30 | d-2 | 30 | — | — |
| Ex. 9 | a-1 | 0.8 | b-1 | 5.7 | b-3 | 2.5 | b-4 | 26.0 | c-1 | 30 | d-1 | 35 | — | — |
| Ex. 10 | a-1 | 1.0 | b-1 | 11.2 | b-3 | 3.8 | b-4 | 34.0 | c-1 | 20 | d-1 | 30 | — | — |
| Ex. 11 | a-1 | 1.0 | b-2 | 11.2 | b-3 | 3.8 | b-4 | 34.0 | c-1 | 20 | d-2 | 30 | — | — |
| Ex. 12 | a-2 | 1.0 | b-2 | 4.2 | b-3 | 2.4 | b-4 | 25.4 | c-1 | 37 | d-2 | 30 | — | — |
| Ex. 13 | a-1 | 0.5 | b-2 | 4.2 | b-3 | 2.4 | b-4 | 25.9 | c-2 | 37 | d-2 | 30 | — | — |
| Ex. 14 | a-1 | 0.5 | b-2 | 4.2 | b-3 | 2.4 | b-4 | 25.9 | c-3 | 37 | d-2 | 30 | — | — |
| Ex. 15 | a-1 | 0.5 | b-2 | 4.2 | b-3 | 2.4 | b-4 | 25.9 | c-4 | 37 | d-2 | 30 | — | — |
| Ex. 16 | a-1 | 0.5 | b-2 | 4.2 | b-3 | 2.4 | b-4 | 25.9 | c-5 | 37 | d-2 | 30 | — | — |
| Ex. 17 | a-1 | 0.75 | b-2 | 11.2 | b-3 | 3.8 | b-4 | 29.25 | c-1 | 40 | d-2 | 15 | — | — |

TABLE 2

| | Thermal conductivity (W/mK) | Breakdown voltage (kV/mm) | Tensile strength (MPa) | Storage elastic modulus (GPa) | Charpy impact strength (kJ/m$^2$) |
|---|---|---|---|---|---|
| Ex. 1 | 0.79 | 4.0 | 110 | 9.4 | 4.2 |
| Ex. 2 | 1.06 | 13.9 | 101 | 9.6 | 4.4 |
| Ex. 3 | 0.98 | 15.6 | 101 | 9.7 | 5.2 |
| Ex. 4 | 1.00 | 14.2 | 106 | 11.3 | 4.7 |
| Ex. 5 | 1.03 | >20.0 | 104 | 11.4 | 5.4 |
| Ex. 6 | 1.01 | >20.0 | 108 | 11.8 | 5.4 |
| Ex. 7 | 0.83 | 15.3 | 108 | 9.0 | 5.2 |
| Ex. 8 | 0.81 | >20.0 | 115 | 9.2 | 6.6 |
| Ex. 9 | 1.05 | 9.5 | 112 | 9.5 | 6.6 |
| Ex. 10 | 0.74 | 14.6 | 115 | 8.5 | 8.1 |
| Ex. 11 | 0.73 | 17.5 | 123 | 9.1 | 8.9 |
| Ex. 12 | 0.86 | >20.0 | 88 | 9.3 | 4.8 |
| Ex. 13 | 0.98 | 15.0 | 101 | 11.3 | 5.1 |
| Ex. 14 | 0.95 | 7.5 | 95 | 11.3 | 4.6 |
| Ex. 15 | 0.93 | 4.5 | 95 | 11.2 | 4.3 |
| Ex. 16 | 0.91 | 4.3 | 93 | 11.2 | 4.2 |
| Ex. 17 | 0.98 | >20.0 | 90 | 8.2 | 5.3 |

TABLE 3

| | Carbon-based nanofiller (A) | | Resin (B) | | | | | | Calcium fluoride (C) | | Filler (D) | | Thermally conductive filler | |
|---|---|---|---|---|---|---|---|---|---|---|---|---|---|---|
| | Kind | % by mass | Kind | % by mass | Kind | % by mass | Kind | % by mass | Kind | % by mass | Kind | % by mass | Kind | % by mass |
| Comp. Ex. 1 | — | — | — | — | — | — | b-4 | 50.0 | c-1 | 20 | d-1 | 30 | — | — |
| Comp. Ex. 2 | — | — | — | — | — | — | b-4 | 40.0 | c-1 | 30 | d-1 | 30 | — | — |
| Comp. Ex. 3 | — | — | — | — | — | — | b-4 | 33.0 | c-1 | 37 | d-1 | 30 | — | — |
| Comp. Ex. 4 | — | — | — | — | — | — | b-4 | 40.0 | — | — | d-1 | 30 | e-1 | 30 |
| Comp. Ex. 5 | a-1 | 0.6 | — | — | — | — | b-4 | 39.4 | — | — | d-1 | 30 | e-1 | 30 |
| Comp. Ex. 6 | — | — | — | — | — | — | b-4 | 40.0 | c-3 | 30 | d-1 | 30 | — | — |
| Comp. Ex. 7 | — | — | — | — | — | — | b-4 | 40.0 | c-5 | 30 | d-1 | 30 | — | — |
| Comp. Ex. 8 | — | — | — | — | b-3 | 5.0 | b-4 | 25.0 | — | — | d-1 | 20 | e-2 | 50 |
| Comp. Ex. 9 | — | — | — | — | b-3 | 3.0 | b-4 | 27.0 | — | — | d-1 | 30 | e-2 | 40 |

TABLE 3-continued

|  | Carbon-based nanofiller (A) | | Resin (B) | | | | | | Calcium fluoride (C) | | Filler (D) | | Thermally conductive filler | |
|---|---|---|---|---|---|---|---|---|---|---|---|---|---|---|
|  | Kind | % by mass | Kind | % by mass | Kind | % by mass | Kind | % by mass | Kind | % by mass | Kind | % by mass | Kind | % by mass |
| Comp. Ex. 10 | a-1 | 0.5 | — | — | b-3 | 3.0 | b-4 | 26.5 | — | — | d-1 | 30 | e-2 | 40 |
| Comp. Ex. 11 | a-1 | 0.8 | b-1 | 7.1 | b-3 | 2.4 | b-4 | 36.7 | — | — | — | — | e-2 | 53 |
| Comp. Ex. 12 | a-1 | 0.75 | b-2 | 11.2 | b-3 | 3.8 | b-4 | 34.25 | — | — | d-1 | 30 | e-3 | 20 |
| Comp. Ex. 13 | a-1 | 1.7 | b-1 | 16.1 | b-3 | 5.3 | b-4 | 76.9 | — | — | — | — | — | — |
| Comp. Ex. 14 | — | — | — | — | — | — | b-4 | 39.0 | c-1 | 30 | d-2 | 30 | — | — |
|  |  |  |  |  |  |  |  |  |  |  | d-3 | 1 |  |  |
| Comp. Ex. 15 | — | — | — | — | — | — | b-4 | 35.0 | c-1 | 30 | d-1 | 15 | — | — |
|  |  |  |  |  |  |  |  |  |  |  | d-3 | 30 |  |  |

TABLE 4

|  | Thermal conductivity (W/mK) | Breakdown voltage (kV/mm) | Tensile strength (MPa) | Storage elastic modulus (GPa) | Charpy impact strength (kJ/m$^2$) |
|---|---|---|---|---|---|
| Comp. Ex. 1 | 0.49 | 17.4 | 75 | 8.5 | 4.0 |
| Comp. Ex. 2 | 0.62 | >20.0 | 80 | 9.1 | 3.9 |
| Comp. Ex. 3 | 0.72 | 17.2 | 78 | 9.3 | 3.8 |
| Comp. Ex. 4 | 0.48 | >20.0 | 75 | 8.4 | 3.9 |
| Comp. Ex. 5 | 0.59 | 0.9 | 80 | 8.9 | 3.9 |
| Comp. Ex. 6 | 0.60 | 17.6 | 88 | 8.9 | 3.7 |
| Comp. Ex. 7 | 0.58 | 10.6 | 85 | 8.7 | 3.7 |
| Comp. Ex. 8 | 0.74 | 15.5 | 73 | 7.5 | 3.8 |
| Comp. Ex. 9 | 0.62 | 14.5 | 77 | 7.9 | 3.9 |
| Comp. Ex. 10 | 0.77 | 0.9 | 80 | 8.3 | 3.9 |
| Comp. Ex. 11 | 0.91 | 3.3 | 69 | 7.5 | 3.9 |
| Comp. Ex. 12 | 0.98 | 3.3 | 75 | 7.0 | 3.8 |
| Comp. Ex. 13 | 0.43 | 3.0 | 49 | 3.0 | 3.8 |
| Comp. Ex. 14 | 0.62 | 5.0 | 82 | 9.1 | 3.9 |
| Comp. Ex. 15 | 0.70 | 0.1 | 88 | 9.9 | 3.9 |

As is apparent from the results shown in Tables 2 and 4, the resin compositions of the present invention (Examples 1 to 17), for which the carbon-based nanofiller (A) and the calcium fluoride (C) were used in combination, had a better balance of high levels of thermal conductive properties, electrical insulating properties, strength, rigidity, and impact resistance than the resin compositions (Comparative Examples 1 to 3, Comparative Examples 6 and 7, and Comparative Example 13) comprising any one of the carbon-based nanofiller (A) and the calcium fluoride (C), the resin compositions (Comparative Example 4, and Comparative Examples 8 and 9) comprising the thermally conductive filler in place of the carbon-based nanofiller (A) and the calcium fluoride (C), the resin compositions (Comparative Example 5, and Comparative Examples 10 to 12) comprising the thermally conductive filler in place of the calcium fluoride (C), and the resin compositions (Comparative Examples 14 and 15) comprising the carbon fiber in place of the carbon-based nanofiller (A).

Specifically, comparison of Example 1 with Comparative Example 2 shows that, simply by adding a small amount of the carbon-based nanofiller (A) to the resin composition comprising the calcium fluoride (C), the thermal conductive properties, tensile strength, and impact resistance were improved, and particularly the tensile strength was remarkably improved. Moreover, comparison of Example 1 with Comparative Examples 14 and 15 shows that, when the carbon-based nanofiller (A) was used in place of the carbon fiber, the thermal conductive properties, tensile strength, and impact resistance were improved, and particularly the tensile strength was remarkably improved. Furthermore, comparison of Example 1 with Comparative Example 5 shows that, when the calcium fluoride (C) was used in place of the thermally conductive filler, the electrical insulating properties were improved although the resin composition comprised the carbon-based nanofiller (A), whose addition in a small amount improves the electrical conductivity of the resin. Moreover, it was shown that the thermal conductive properties, tensile strength, storage elastic modulus, and impact resistance were improved, and particularly the tensile strength was remarkably improved.

Meanwhile, comparison of Comparative Example 12 with Comparative Example 5 shows that when the polyphenylene sulfide, the polyolefin-based polymer, and the modified polyolefin-based polymer were used in combination for the resin composition comprising the carbon-based nanofiller (A) and the thermally conductive filler, the thermal conductive properties and electrical insulating properties were improved, but the breakdown voltage was less than 3.5 kV/mm, which was an insufficient breakdown voltage for insulating resin parts for automobiles. Moreover, the physical properties such as the tensile strength, storage elastic modulus, and impact resistance were also insufficient for insulating resin parts for automobiles.

On the other hand, comparison of Example 8 with Example 1 shows that when the polyphenylene sulfide, the polyolefin-based polymer, and the modified polyolefin-based polymer were used in combination for the resin composition comprising the carbon-based nanofiller (A) and the calcium fluoride (C), the electrical insulating properties, tensile strength, and impact resistance were improved, and particularly the electrical insulating properties and impact resistance were remarkably improved.

Comparison of Examples 3 and 5 with Examples 2 and 4 shows that the use of the ethylene-based copolymer as the resin (B) improved the electrical insulating properties and impact resistance. Moreover, comparison of Examples 2 and 3 with Examples 4 and 5 shows that the use of a glass fiber having a small average diameter as the filler (D) improved the tensile strength and storage elastic modulus.

Comparison of Example 5 with Example 12 shows that the use of the carbon-based nanofiller (A) having a small average diameter enabled the improvement of the thermal conductive properties, tensile strength, storage elastic modulus, and impact resistance, even when the amount added was small.

Moreover, comparison of Examples 5, and 13 to 16 with one another shows that, as the average diameter of the calcium fluoride (C) was reduced, the thermal conductive properties, electrical insulating properties, tensile strength, and impact resistance were improved, and particularly the electrical insulating properties were remarkably improved.

[Industrial Applicability]

As described above, the present invention makes it possible to obtain a resin composition having a good balance of high levels of thermal conductive properties, electrical insulating properties, strength, rigidity, and impact resistance.

Accordingly, the resin composition of the present invention can be used for parts required to have high thermal conductive properties and electrical insulating properties, and is preferably used, for example, for electrically insulating parts such as resin parts for motors and resin parts for power control units.

The invention claimed is:

1. A resin composition comprising 0.1 to 40% by mass of a carbon-based nanofiller, 5 to 90% by mass of a resin and 5 to 90% by mass of calcium fluoride.

2. The resin composition according to claim 1, wherein an average particle diameter of the calcium fluoride is 150 μm or less.

3. The resin composition according to claim 1, wherein the resin comprises two or more resins.

4. The resin composition according to claim 1, wherein the resin comprises a polyolefin-based polymer.

5. The resin composition according to claim 1, wherein the resin comprises a modified polyolefin-based polymer.

6. The resin composition according to claim 1 further comprising a filler other than the carbon-based nanofiller and other than the calcium fluoride.

7. An electrically insulating part obtained from the resin composition according to claim 1.

8. A resin part for a motor obtained from the resin composition according to claim 1.

9. The resin part for a motor according to claim 8, wherein the resin part for a motor is any one of a stator part for a motor and a rotor part for a motor.

10. A resin part for a power control unit obtained from the resin composition according to claim 1.

11. The resin composition according to claim 3, wherein the resin comprises a polyolefin-based polymer.

12. The resin composition according to claim 3, wherein the resin comprises a modified polyolefin-based polymer.

13. The resin composition according to claim 3, further comprising a filler other than the carbon-based nanofiller and other than the calcium fluoride.

14. The resin composition according to claim 11, wherein the resin further comprises a modified polyolefin-based polymer.

15. The resin composition according to claim 11, further comprising a filler other than the carbon-based nanofiller and other than the calcium fluoride.

16. The resin composition according to claim 14, further comprising a filler other than the carbon-based nanofiller and other than the calcium fluoride.

17. The resin composition according to claim 1, wherein the resin comprises a polyarylene sulfide.

18. The resin composition according to claim 11, wherein the resin further comprises a polyarylene sulfide.

19. The resin composition according to claim 14, wherein the resin further comprises a polyarylene sulfide.

20. The resin composition according to claim 16, wherein the resin further comprises a polyarylene sulfide.

* * * * *